March 11, 1947.　　　　K. V. HART　　　　2,417,075
WELDING APPARATUS
Filed Dec. 15, 1944　　　　5 Sheets-Sheet 1

INVENTOR.
KENNETH V. HART
BY
Richey & Watts
ATTORNEYS

INVENTOR.
KENNETH V. HART
BY
Richey & Watts
ATTORNEYS

March 11, 1947.  K. V. HART  2,417,075
WELDING APPARATUS
Filed Dec. 15, 1944  5 Sheets-Sheet 3
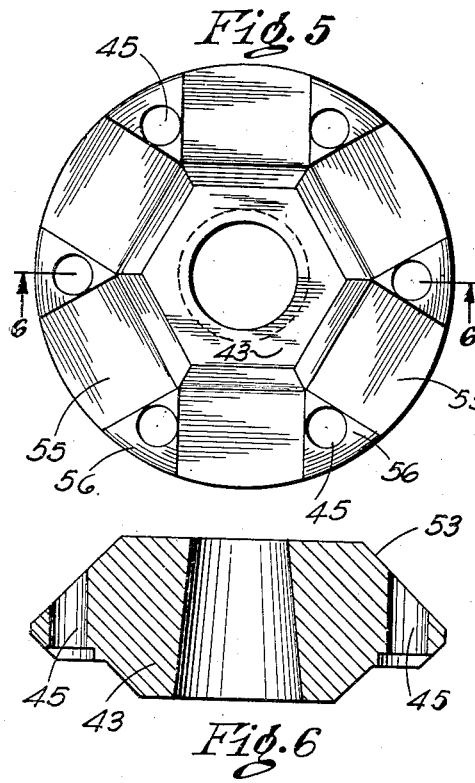
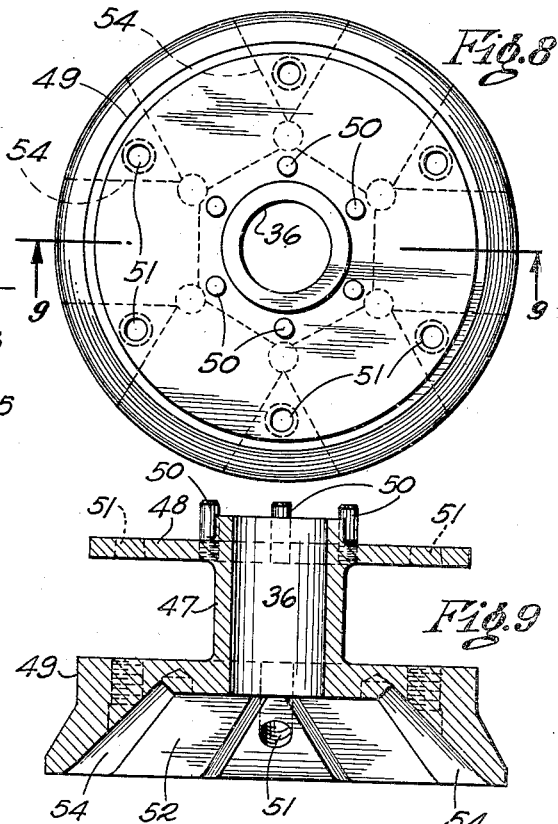
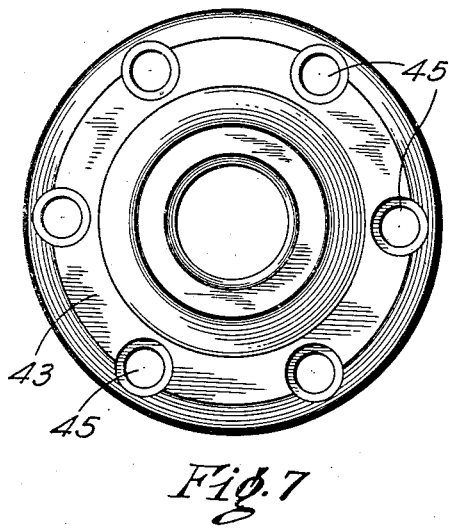
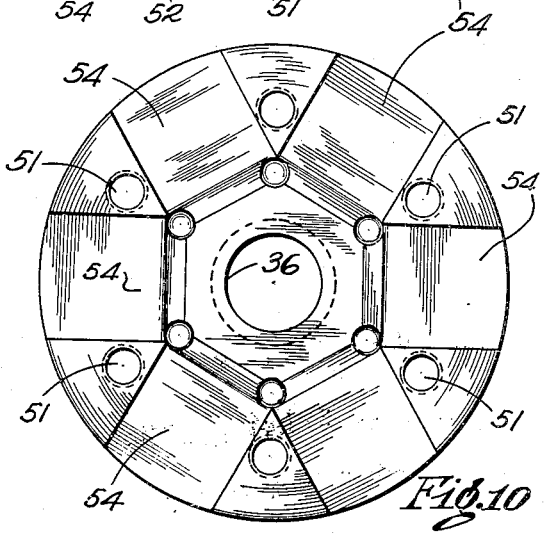
INVENTOR.
KENNETH V. HART
BY
*Richey Watts*
ATTORNEYS

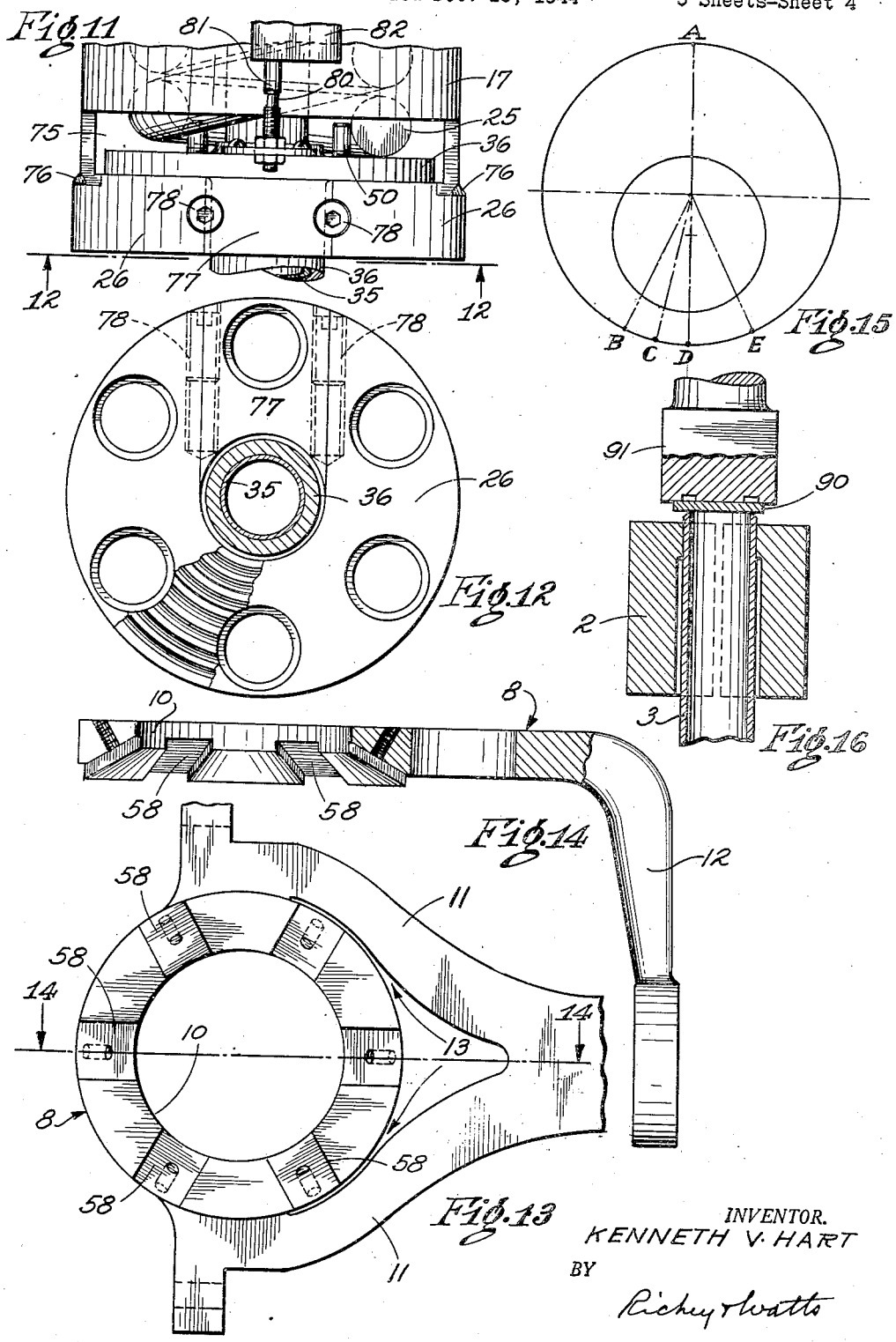

March 11, 1947.  K. V. HART  2,417,075
WELDING APPARATUS
Filed Dec. 15, 1944  5 Sheets-Sheet 5

INVENTOR.
KENNETH V. HART
BY
Richey & Watts
ATTORNEYS

Patented Mar. 11, 1947

2,417,075

UNITED STATES PATENT OFFICE 2,417,075

WELDING APPARATUS

Kenneth V. Hart, Cleveland, Ohio

Application December 15, 1944, Serial No. 568,259

16 Claims. (Cl. 219—4)

This invention relates generally to welding machines and more particularly to a new machine for forming an electric resistance "surface weld" joint between the end of a tubular metal article and the surface of another metal article.

In my Patent No. 2,091,982, issued Sept. 7, 1937, I disclosed a method of making a "resistance surface weld" and described certain apparatus which might be used to carry out the method claimed in that patent. The apparatus so described included a lower fixed electrode and an upper movable electrode between which electrodes the articles to be joined by the weld were to be positioned. That apparatus also include means for moving the upper electrode toward the lower electrode to initiate the welding operation and yielding mechanism to cause the movable electrode to move the upper article toward the lower article when the metal of those articles softened and became extrudable, deformable, or forgeable, that is, to cause the upper electrode to "follow up" or move the upper article toward the lower article when the engaging metal of the two articles would permit.

The present invention is primarily concerned with new "follow up" welding apparatus. The apparatus of the present invention is capable of producing the resistance surface welds described and claimed in my Patent No. 2,183,563 and of carrying out the method claimed in my Patent No. 2,091,982 and is also capable of carrying out the method and making the welds described and claimed in my copending application Ser. No. 568,258 filed December 15, 1944.

In the drawings accompanying and forming a part of this specification,

Figs. 5, 6 and 7 are, respectively, a top plan view, a central vertical view and a bottom plan view of the die holder of Fig. 2;

Figs. 8, 9 and 10 are, respectively, a top view, a central vertical sectional view and a bottom plan view of the inner slide head of Fig. 2;

Figs. 11 and 12 are, respectively, a fragmentary side elevational view and a bottom plan view, with parts broken away, of the assembled slides and associated parts of Fig. 2;

Fig. 13 is a fragmentary bottom plan view of the upper current conductor plate of Fig. 2;

Fig. 14 is a side elevational view of the plate of Fig. 13, partly sectioned on line 14—14 of Fig. 13;

Fig. 15 is a diagrammatic view showing the sequence of operations during one cycle of operation of the apparatus of Fig. 2;

Fig. 16 is a central, vertical, cross-sectional view of the assembly of dies, a tube and a plate, preparatory to welding;

Figure 19:
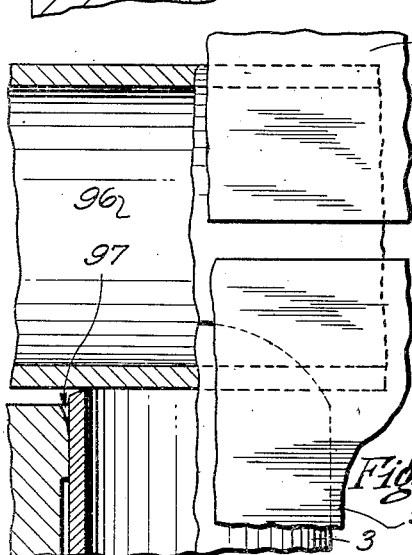
Figure 20:
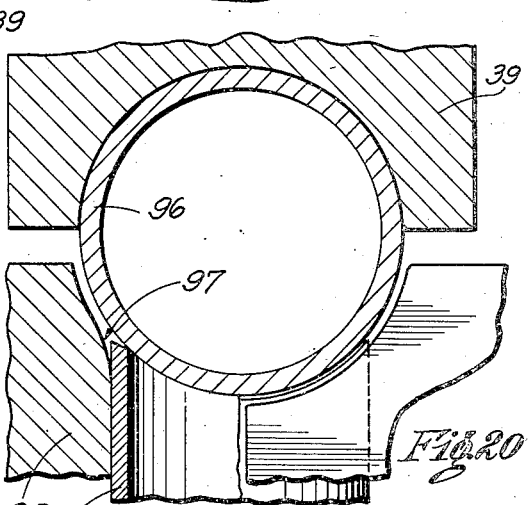
Figure 21:
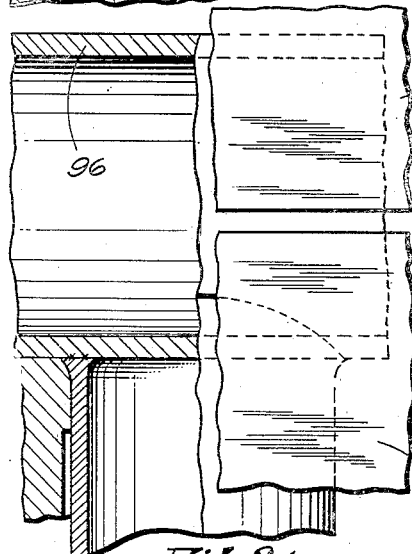
Figure 22:
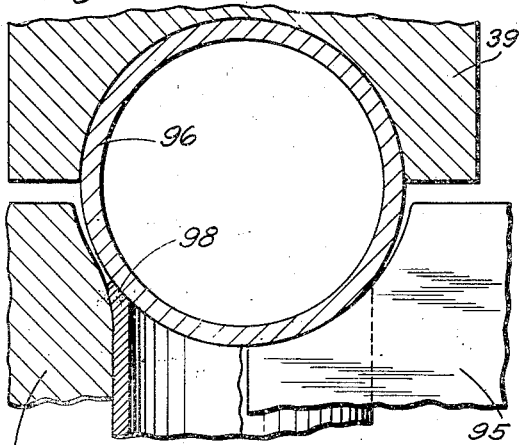

Figs. 19 and 20 are, respectively, a longitudinal side elevational view, partly in section, and a transverse side sectional view, partly in elevation, showing the assembly of a new die for welding the end of a tube to the side of a tube just prior to the time of welding; and, Figs. 21 and 22 are views similar to Figs. 19 and 20 just after the time of welding.

The apparatus shown in Figs. 1 to 14 comprises a frame 1 supporting a fixed die or clamping means 2 in which one of the parts to be welded, for example, tube 3, may be supported and held during the welding operation. The frame also includes a pair of opposed V-shaped guides 4 along which run rollers 5 carried by reciprocable pressure device or head 6. The frame 1 has an opening 7 axially aligned with the moving head 6. A current conductor 8 is secured to the frame, and is insulated therefrom, as by insulation 9. Conductor 8 (Figs. 13 and 14) is preferably a thick plate having an opening 10 aligned with opening 7 and having arms 11 extending from diametrically opposite places along the edges of body 8 to an end flange 12 which may be secured to one terminal of a transformer (not shown). It will be understood that the other terminal of the transformer is suitably connected to the fixed die or clamping means 2. The space 13 between that portion and arms 11 may be filled with insulation, the better to distribute current equally to the circular portion.

If and when it is desired to use two or three transformers, the arms 11 and flange 12 may be replaced by a plurality of conductors, preferably laminated, each of which is clamped to plate 8 and to a transformer. The current will be distributed uniformly to the movable die when two transformers are connected to plate 8 by conductors which are 180° apart, that is, at diametrically opposite places as noted in Fig. 13 or when three transformers are connected to plate 8 by conductors which are 120° apart.

The reciprocable pressure device or head 6 comprises endwise movable outer and inner slides 15 and 16. The outer slide comprises a cylinder 17 provided with brackets 18 carrying rollers 5 which roll on gibs 4. These rollers are insulated from their supporting brackets, as at 19. A plug 20 is secured in the upper end of cylinder 17 in any suitable manner, as by bolts 21, and is provided with a member 22 which may embody a bearing and which serves to attach the plug to the crank pin of a rotatable crankshaft (not shown). When the frame 1 is part of a conventional punch press the crankshaft will also be equipped with the usual flywheel and clutch. It will be understood that head 6 may be operated by any other suitable means including a fluid pressure cylinder. The plug 20 has a central axial opening in which bearing 23 is located. The inner or lower end of plug 20 is cut away to receive a thrust bearing 24 on which one end of spring 25 bears and which permits turning movement of spring 25. At its lower end cylinder 17 is attached, as by welding, to an abutment in the form of a ring 26 which is provided with a plurality of holes in which stabilizers 27 are mounted. As shown, each stabilizer comprises outer and inner concentric steel shells 27a and 27b bonded to an intermediate rubber cylinder 27c. The inner shells 27b rest on flange 49 and support flange 48 of head 36, presently to be described, against the pressure of spring 25. It will be understood that the stabilizers 27 may be replaced by other means, such as thrust bearings, which will maintain head 36 and ring 26 in alignment and permit free relative movement of the head and ring.

The inner slide comprises a tube 35 whose upper end slides freely in bearing 23 and whose lower end has a pressed fit in head 36 which is held in place by a stud 37. This head cooperates with and is capable of limited movement relative to abutment or ring 26. The upper die 39 is shaped to receive a tube 40 to be welded to tube 3 and has a tapered shank 41 disposed in a correspondingly shaped hole in die holder 43. Die 39 is preferably composed of copper or a copper alloy and is silver plated on the shank. The taper of the shank is such that when the die is pressed into holder 43 it will remain there until forcibly removed. A plurality of dowel pins 44 have screw threaded engagement in holes in head 36 and pass thru holes 45 in die holder 43, have a close, light pressed fit with inner shells 27b of the stabilizers 27 and have tapered upper ends 46 extending into correspondingly tapered holes in the upper flange part of head 36.

Figure 1:
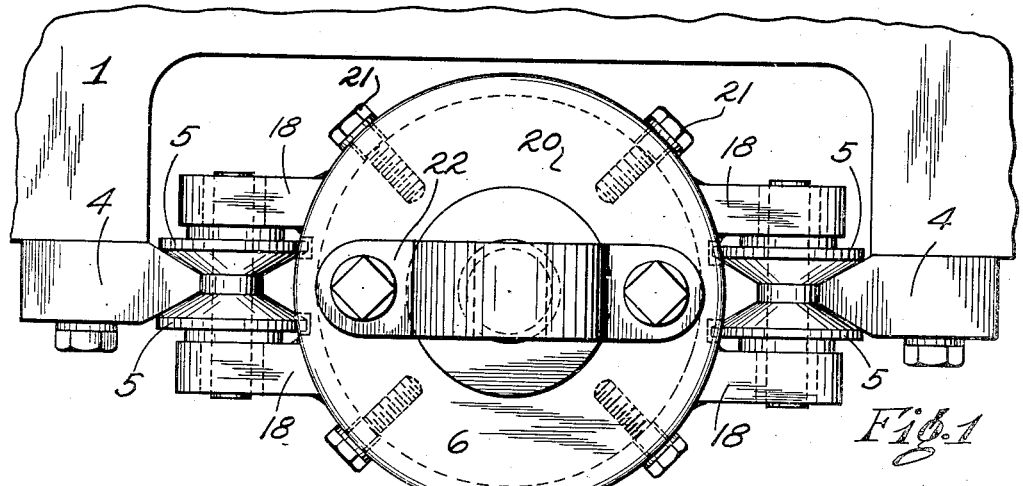
Figure 1 is a fragmentary top plan view of a welding machine embodying the present invention.
Figure 3:
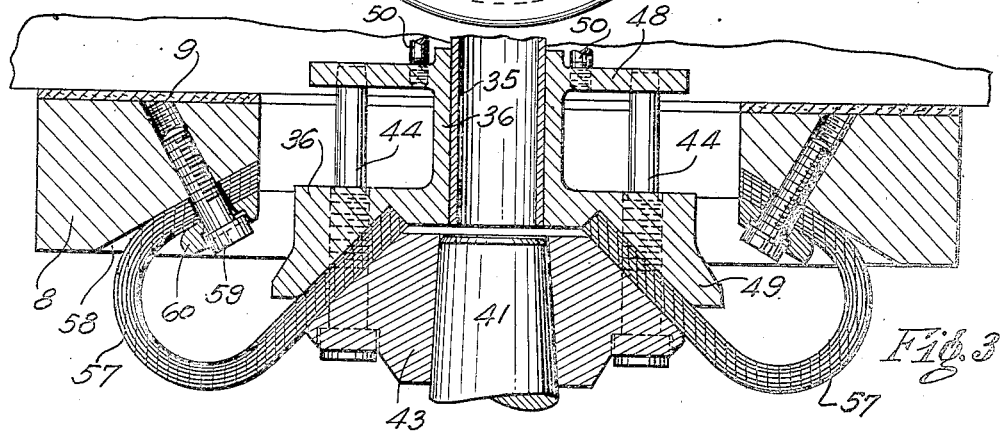
Figs. 3 and 4 are, respectively, a central vertical sectional view and a side elevational view of the assembled die holder, inner slide head and current carrying laminations of the machine of Figs. 1 and 2.
Figure 4:
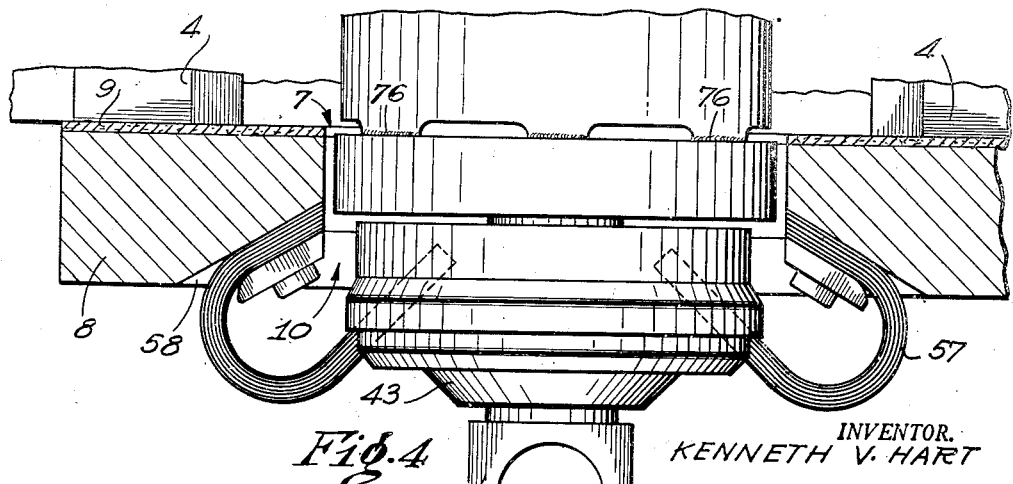
Figure 2:
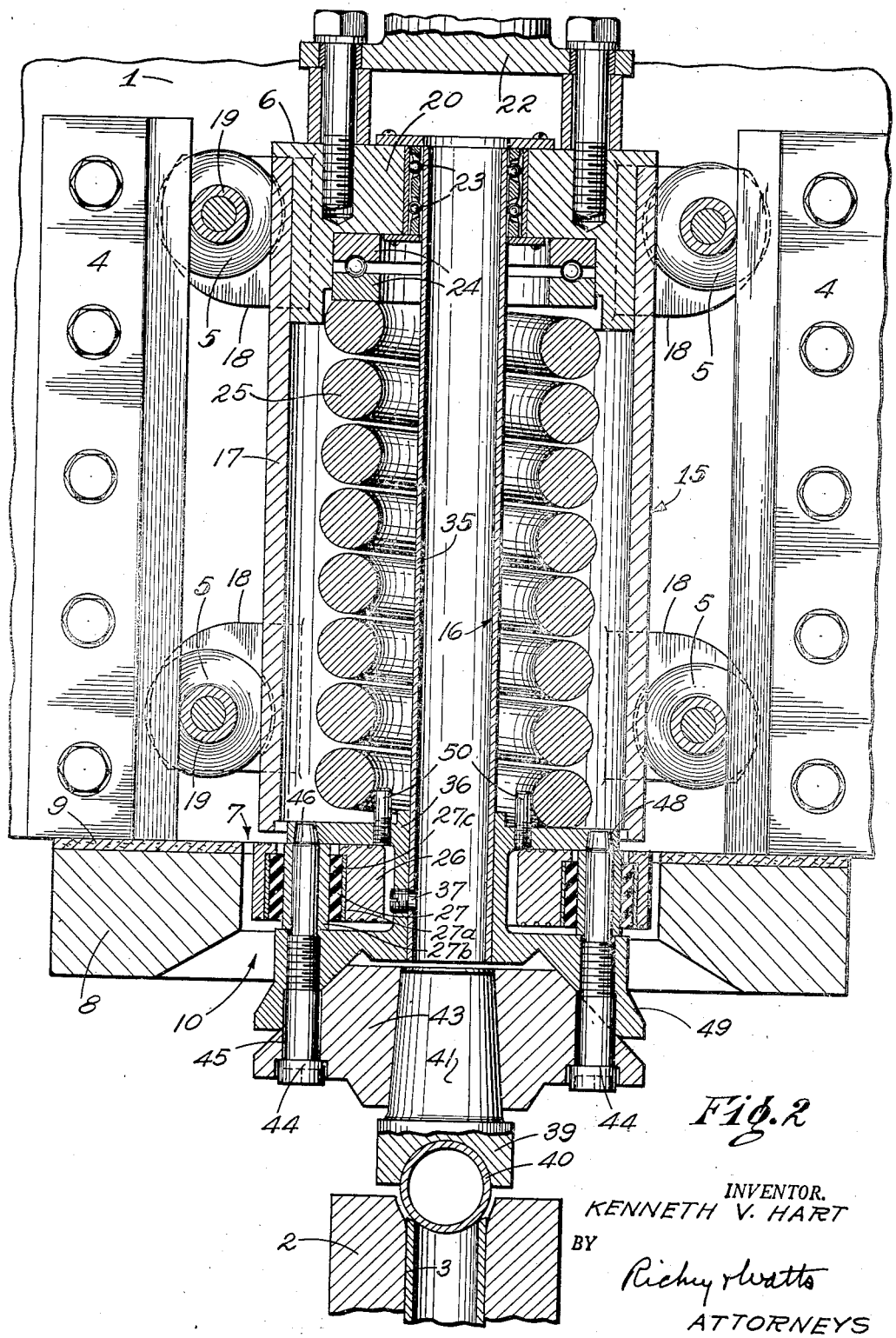
Figure 2 is a vertical central sectional view of the machine of Fig. 1 with certain parts in elevation.

Inner slide head 36, as will be noted from Figs. 2 and 9, consists of a central, cylindrical part 47, an upper end flange 48 and a lower end flange 49. The upper flange 48 carries upwardly extending studs 50 to lie within and position springs 25 and has a plurality of tapered holes 51 to receive the correspondingly tapered ends 46 of pins 45. The upper and lower flanges 48 and 49 of head 36 are spaced apart a distance slightly greater than the thickness of ring 26 and receive that ring between them. The lower flange 49 has a lower, generally frusto-conical surface 52 which conforms generally to the upper frusto-conical surface 53 of die holder 43 but which is provided with a plurality of recesses 54. The upper surface of die holder 43 has a plurality of lamination receiving recesses 55 and intervening lands 56. When head 36 and holder 43 are in assembled position each pair of recesses 54 and 55 provides a space for current conducting laminations 57.

The inner ends of laminations 57 are clamped in recesses 54 and 55 by screw pins 44, and are generally U-shaped. Their outer ends are held in recesses 58 in conductor plate 8, as by cap screws 59 extending thru the laminations and threaded into plate 8 and pressing a clamp 60 against the outer surface of the laminations.

Laminations 57 are preferably composed of separate copper bands of considerable width and slight thickness and each one is preferably silver-plated. The several laminations in each group are assembled in such a position that they do not contact with one another around the loop. The several groups of laminations should be capable of such current carrying capacity that four of the groups can conduct the welding current without undue heating, the two remaining groups serving mainly to conduct current when and if the first four groups become heated to such an extent as to cause diversion of current to those two groups.

The manner of assembling inner slide head 36 with ring 26 is shown in Figs. 11 and 12. The lower edge of cylinder 17 is cut away, as shown at 75, and at other places is welded to the top surface of ring 26, as indicated at 76. Ring 26 comprises a removable segment 77 which is held in assembled position with the remainder of the ring, as by Allen screws 78. When inner slide head 36 is to be assembled with cylinder 17 and ring 26, segment 77 is removed, head 36 is slid into place with its flange 48 passing thru cut away space 75 and its cylinder part 47 passing thru the opening in ring 26, and then segment 77 is replaced.

It will be understood that spring 25 is strong and is compressed when in assembled position such as that shown in Fig. 2. It is important that this spring be strong enough and under sufficient compression to move the inner slide and its associated parts relative to the outer slide just as rapidly as the softening of the electrically heated metal of the metal parts 3 and 40 will permit. Preferably, the spring 25 is compressed to such an extent, when the top of lower flange 49 of head 36 engages the lower surface of ring 26, that the total length of the spring is about 1/4" to 3/8" longer than it would be if the coils engaged each other.

The illustrated spring 25 was made from S. A. E. 9262 bar stock and when compressed, as just stated, was capable of exerting endwise pressure amounting to from 4000 to 7000 lbs. Since the area to be welded determines the spring pressure required, the size of the spring and the extent of its compression will vary with the sizes of the tubes to be welded, small tubes requiring less pressure than large tubes. Springs with less or more pressure than the amounts just stated may be used when desired.

Fig. 11 shows switch means for use during the welding operation. Stud 80, attached to the top flange 48 of inner slide head 36 is aligned with pin 81 of current controller 82. Stud 80 is adjustable so that, when the outer slide moves down relative to head 36 during the initial application of pressure to the parts to be welded, stud 80 will move pin 81 and complete the electrical circuit. The duration of current flow is determined by a timer (not shown but preferably of the electronic tube type) so that it may extend over only a small number of cycles, as is described in Patent No. 2,091,982.

The stabilizers 27, described above, serve to compensate for inaccuracies in the parts being welded and also prevent binding of the inner and outer slides during their relative movements. If the tube 3 does not engage thruout its entire end circumference with tube 40 with approximately uniform pressure, stabilizers 27 permit slight lateral shifting of die 39 and head 36 to bring about satisfactory engagement when pressure is applied by the downward movement of the outer slide. During assembly of stabilizer parts 27a, 27b and 27c with ring 26 and pins 44, rubber 27c is tensioned and such tensioning is increased by movement of head 36 upwardly (in Fig. 2) relative to ring 26. When head 36 is moved downwardly relative to ring 26, this tension aids in that movement.

The operation of the apparatus above described is substantially as follows, reference also being had to Fig. 15 in which the sequence of operations during one cycle of machine operation is indicated by letters A, B, C, D and E.

The pieces to be welded together by a resistance surface weld joint, in this case tubes 3 and 40, are placed in contact with one another, as shown in Fig. 2 with the tube 3 being clamped in the lower fixed die 2 and the tube 40 resting on the upper end of tube 3. The outer slide 15 is moved downwardly from A in Fig. 15, as by rotation of the crankshaft of the machine, with coincident movement of the inner slide 16 and eventual resultant engagement of die 39 with tube 40 at about point B on Fig. 15. The downward movement of the crankpin, corresponding to the space from B to D on Fig. 15 results in movement of outer slide 15 relative to the inner slide 16 with resultant increase of compression of spring 25. The extent of such relative movement is determined by the space between the top of flange 49 of head 36 and the bottom of ring 26. As shown in Fig. 2, this space is $\frac{3}{32}''$. It will be understood that during the time spring 25 is being so compressed, the ring 26 of the outer slide will move down toward the lower flange 49 of head 36, thereby providing a space between the upper surface of ring 26 and the lower surface of flange 48 of head 36. Between the time the outer slide 15 starts to move down relative to slide 16 and the time it reaches position C, stud 80 on body 36 engages pin 81 on the current controller 82 and actuates that control and as a result a heavy welding current flows for a brief interval of time.

The flow of the heavy welding current thru the tubes 40 and 3 heats the metal in the contacting surfaces and adjacent thereto to such an extent that it can be readily deformed, extruded or forged under pressure. As the metal reaches that condition, the spring 25 expands and forces the movable die 39 to move relative to the outer slide and to move tube 40 toward tube 3, that is, to "follow up" the softening of the metal. It will be understood that when the space between ring 26 and head 36 is $\frac{3}{32}''$, as just stated, the relative movement of these parts is slightly less than $\frac{3}{32}''$ and also that the current flow begins while that relative movement is in progress. Since the parts of the inner slide are relatively light in weight, the force exerted by spring 25 is large, and laminations 57 tend to straighten out when the current flows therethru, the "follow up" motion of the inner slide is positive, forceful and almost instantaneous for it proceeds as rapidly as the suddenly heated metal will permit. As the initial contact area between tubes 3 and 40 increases, due to the almost instantaneous heating of the metal, the follow up pressure of the inner slide and the resultant movement of the tubes toward each other, the metal at the end of tube 3 is extruded or deformed and fills more or less completely the V-shaped space between the end of the tube 3 and the side of tube 40. By properly correlating the size of the triangular space between tubes 3 and 40, the duration and amount of current flow and the extent of follow up movement of the inner slide, the heated metal may be caused substantially to fill the triangular space between tubes 3 and 40, or even to fill that space and project therebeyond where it may be shaped into fillet form, particularly when the dies of Figs. 17 to 21 are being used.

The "follow up" pressure of the inner slide continues until the crankpin reaches a point, indicated by E on Fig. 15, at which time the ring 26, which has been moving upwardly after the crankpin passed the point D, engages the lower surface of flange 48 of head 36 and moves the latter upwardly. Then further movement of the crankpin moves both slides up together to the top of their stroke, as indicated by point A on Fig. 15.

During the follow up movement of the inner slide, this slide, if previously shifted laterally by the cold tubes tends to be recentered in the outer slide by stabilizers 27, as the tube metal softens, that is, these pins and stabilizers permit slight lateral movement of the inner slide out of axial alignment with the outer slide due to slight burrs or other machining inaccuracies in the cold tubes but tend to restore axial alignment when the tubes are heated.

Then the welded tubes 3 and 40 are removed by unclamping fixed die 2 and other similar pieces are inserted in the machine after which the foregoing operation may be repeated.

Fig. 16 shows the lower die 2 clamped to a tube 3 which has its upper end projecting slightly beyond the upper end of the die and beveled so that a thin, narrow, circumferential edge of the tube engages the lower surface of plate 90. The upper die 91 which is similar to die 39, except that its shape is adapted to the flat plate 90, bears against the upper surface of plate 90. The position of these several parts is approximately the position they will occupy when the crankpin of the welding machine is at position B or C of Fig. 15, that is, when outer slide cylinder 17 of Fig. 2 begins to move down relative to inner slide head 36 or at the instant that current begins to flow thru plate 90 and tube 3. It will be understood that the welded joint formed between plate 90 and tube 3 will be substantially like that described in my Patent No. 2,183,563.

Figure 17:
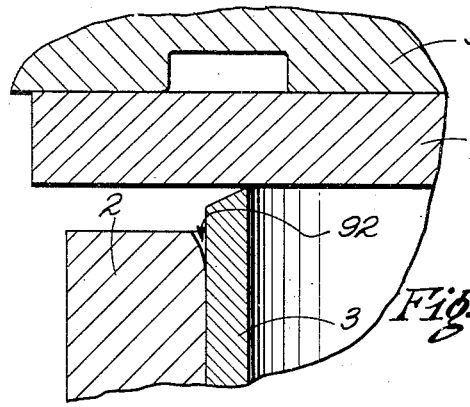
Fig. 17 is a view similar to Fig. 16 but showing, in preweld assembled position, a new die for making a new resistance surface weld between a plate and the end of a tube.
Figure 18:
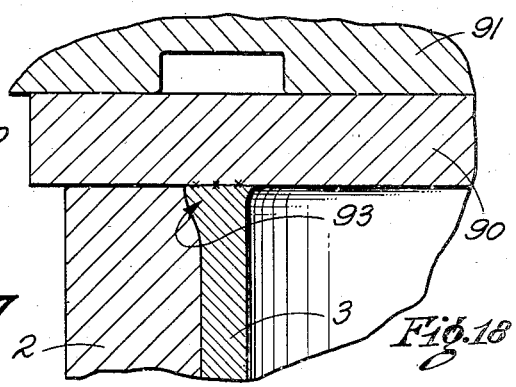
Fig. 18 is a view similar to Fig. 17 but showing the position of the parts and the weld at the end of the welding operation.

A welded joint and new apparatus for making such a joint are shown in Figs. 17 and 18. In these figures the tube 3, plate 90 and die 91 are like correspondingly numbered parts of Fig. 16. The lower die 2 is like die 2 of Fig. 16 except that its tube-engaging surface is cut away to provide space 92 into which the heated metal at the end of tube 3 is forced during the "follow up" operation of the welder, that is, while the crankpin of the welder is moving from points C to D of Fig. 15. It will be understood that Figs. 17 and 18 show the apparatus and spacing greatly exaggerated. For example, the space between the end of die 2 and plate 90 is about $\frac{1}{16}''$, the tube 3 is about .062'' in thickness, the axial length of space 92 is about $\frac{1}{16}''$, and the radial length of space 92 at the upper end of die 2 is about .031''. The angle included between the lower surface of plate 90 and the beveled end of tube 2 is about 25 degrees. When the crankpin of the welder reaches position D in Fig. 15 the parts of Fig. 17 are disposed approximately as shown in Fig. 18. In other words, when the upper end of tube 3 is heated by the welding current, it is deformed under the pressure applied by the welder with resultant upsetting and filling of space 92 and the formation of a joint having the fillet indicated at 93 in Fig. 18. The space between the upper end of die 2 and the lower surface of plate 90 in Fig. 17 is only slightly less than the vertical space between ring 26 and inner slide head 36 of Fig. 2.

Figs. 19 and 20 correspond to Fig. 17, and Figs. 21 and 22 correspond to Fig. 18. These figures show a new die and joint as applied to two tubes instead of to one tube and a plate. In these figures the lower die 95 clamps around the upper end of tube 3 and extends thereabove in close proximity to the upper tube 96 on which upper die 39 engages. It will be noted that the upper end of tube 3 is shaped and beveled to make a continuously circumferential line contact with the outer surface of tube 96 and a small included angle with that surface. When the welding current flows thru tubes 3 and 96 very high heat is generated at the narrow line contact which is the place of greatest resistance and rapidly decreases as the metal increases in thickness. The localized heating of the beveled end part of the tube fits it for welding and the lower heating of the metal behind the beveled part of the tube fits it for forging or upsetting. The pressure applied forms the weld 98.

The new filleted weld described generally herein is described in more detail and is claimed in my copending application Ser. No. 568,258 filed December 15, 1944.

The manner of beveling the tube ends, the volume of current and the duration of flow of current which may be used with the present invention are described in my Patent No. 2,091,982.

Having thus described my invention so that others skilled in the art may be able to understand and practice the same, I state that what I desire to secure by Letters Patent is defined in what is claimed.

What is claimed is:

1. An electric welder comprising a fixed work holding die, a movable work holding die, electrical means for passing welding current thru said dies and metal work pieces engaging each other and said dies, and pressure means for moving said movable die toward said fixed die and thereby exerting welding pressure on said engaging work pieces, said pressure means including an outer tubular slide having an abutment, an inner tubular slide operatively connected to said movable die and capable of limited movement relative to said abutment, and spring means within the outer slide and around the inner slide for moving said inner slide relative to said abutment and fixed die when the current has heated the work pieces.

2. An electric welder comprising a fixed work holding die, a movable work holding die, electrical means for passing welding current thru said dies and metal work pieces engaging each other and said dies, and pressure means for moving said movable die toward said fixed die and thereby exerting welding pressure on said engaging work pieces, said pressure means including an outer axially reciprocable cylinder having a ring at one end and a plug near its other end, an inner head within said cylinder and operatively connected to said movable die and having flanges on opposite sides of said ring, the ring being of such thickness relative to the space between said flanges as to permit limited relative movement of the ring and inner head, and compressed spring means within said cylinder and exerting force axially and in opposite directions on said plug and inner head.

3. Apparatus for making a welded joint at the end of a metal tube comprising a fixed die for holding a tube, a frame, a conductor connected to said frame, said frame and conductor having openings aligned with said fixed die, a head reciprocable axially in said openings, said head including outer and inner members associated with each other for limited relative axial movement, a spring engaging said members for moving the inner member toward said fixed die relative to said outer member, a movable die connected to said inner member, and U-shaped current conducting laminations secured at their ends to said conductor around the opening therethru and to the opposed surfaces of said inner member.

4. Apparatus for making a welded joint at the end of a metal tube comprising a fixed die for holding a tube, a frame, a conductor connected to said frame, said frame and conductor having openings aligned with said fixed die, a head in said openings, means to reciprocate said head axially, said head including outer and inner members associated with each other for limited relative axial movement, a spring engaging said members for moving the inner member toward said fixed die relative to said outer member, a movable die connected to said inner member, and U-shaped current conducting laminations secured to said conductor around the opening therethru and to said inner member, said laminations being so disposed that when current flows therethru they will tend to urge said inner member toward said fixed die.

5. Apparatus for making a welded joint at the end of a metal tube comprising a fixed die for holding a tube, a frame, a conductor connected to said frame, said frame and conductor having openings aligned with said fixed die, a head reciprocable axially in said openings, said head including outer and inner members associated with each other for limited relative axial movement, fixed guides on said frame and guide followers on said head, a spring engaging said members for moving the inner member toward said fixed die relative to said outer member, a movable die associated with said inner member, and flexible means around the opening thru said conductor for carrying current between said movable die and said conductor.

6. A pressure head for an electric welder comprising an outer cylinder having a plug at one end and having an abutment ring at the other end, an inner head in and capable of limited axial movement relative to said ring, a tube connected near one end to said inner head and slidable near the other end in said plug, spring means compressed in the cylinder and pressing against said inner head, and means associated with said ring and said inner head for guiding said ring and inner head during their relative axial movements.

7. A pressure device for an electric welder comprising an outer cylinder having an attaching plug at one end and an abutment ring at the other end, guiding means attached to the exterior of said cylinder, an inner head in and capable of limited axial movement relative to said ring, a tube connected near one end to said inner head and slidable near the other end in said plug, compressed spring means within the cylinder and around said tube and bearing on said plug and said inner head, and means associated with said ring and said inner head for guiding said ring and inner head during their relative axial movements.

8. A pressure head for an electric welder comprising an outer cylinder having an attaching plug at one end and an abutment ring at the other end, an inner head in and capable of limited axial movement relative to said ring, said inner head including a cylindrical part extending thru said ring and end flanges on opposite sides of said ring, a tube connected near one end to said inner head and slidable near the other end in said plug, compressed spring means bearing on said plug and said inner head, and means associated with said ring and said inner head for guiding said ring and inner head during their relative axial movements and for supporting one end flange of said inner head.

9. A pressure head for an electric welder comprising an outer cylinder having an attaching plug at one end and an abutment ring at the other end, an inner head in and capable of limited axial movement relative to said ring, said inner head including a cylindrical part extending thru said ring and end flanges on opposite sides of said ring, a tube connected near one end to said inner head and slidable near the other end in said plug, spring means compressed between said plug and said inner head, means associated with said ring and said inner head for guiding said ring and inner head during their relative axial movements, said guiding means including pins carried by said inner head and extending thru said ring and bearings in said ring and engaging said pins, said bearings having outer and inner concentric tubes connected together by resilient material.

10. A pressure head for an electric welder comprising an outer cylinder having an attaching plug at one end and an abutment ring at the other end, an inner head in and capable of limited axial movement relative to said ring, said inner head including a cylindrical part extending thru said ring and end flanges on opposite sides of said ring, a tube connected near one end to said inner head and slidable near the other end in said plug, spring means compressed between said plug and said inner head, means associated with said ring and said inner head for guiding said ring and inner head during their relative axial movements, said guiding means including pins carried by said inner head and extending thru said ring and bearings in said ring and engaging said pins, said bearings having outer and inner concentric tubes conected together by resilient material, said inner tubes extending between and supportingly engaging the flanges of said inner head.

11. A pressure head for an electric welder comprising an outer cylinder having an attaching plug at one end and an abutment ring at the other end, an inner head in and capable of limited axial movement relative to said ring, a tube connected near one end to said inner head and slidable near the other end in said plug, spring means compressed between said plug and said inner head, means associated with said ring and said inner head for guiding said ring and inner head during their relative axial movements, a die holder associated with said inner head, and means to clamp the ends of current conductors between said inner head and die holder.

12. A pressure device for an electric welder comprising an outer endwise movable member having a ring at one end, an inner endwise movable member having a head extending thru said ring and flanges on opposite sides of said ring, compressed spring means within the outer member, bearing on one of said flanges and tending to move the inner member out of the outer member, pins extending thru one of said flanges and into the other flange, and tubes surrounding said pins between said flanges and supporting said spring-engaged flange.

13. A pressure device for an electric welder comprising an outer endwise movable member having a ring at one end, an inner endwise movable member having a head extending thru said ring and flanges on opposite sides of said ring, compressed spring means within the outer member, bearing on one of said flanges and tending to move the inner member out of the outer member, a die holder cooperating with said head, pins extending thru said die holder and one of said flanges for securing the holder to said head, said pins extending into the other flange, and tubes surrounding said pins between said flanges and supporting said spring-engaged flange.

14. A pressure device for an electric welder comprising an outer endwise movable member having a ring at one end and a thrust bearing near the other end, an inner endwise movable member having a head extending thru said ring, spring means within the outer member pressing against said thrust bearing and said head to move the inner member out of the outer member, said head having a recessed outer end surface, a die holder in said recess, and means for clamping the ends of current conductors between said head and die holder.

15. A pressure device for an electric welder comprising an outer endwise movable member having a ring at one end and a thrust bearing and a guide bearing near the other end, a light weight inner, endwise movable member in said outer member, said inner member comprising a head extending thru said ring, a thin wall tube extending from said head into said guide bearing, compressed spring means within the outer member and pressing against said thrust bearing and said head, a die holder in the outer end of said head, a plurality of pins for clamping current conductors between said head and die holder, and means associated with said ring and pins for guiding the inner and outer members during their relative movements.

16. Welding apparatus comprising a reciprocable pressure device, an annular current conductor surrounding said device, equal length arms leading from diametrical places on said conductor along its sides to a junction, insulation between said arms and the adjacent sides of said conductor, and current conducting means connecting said device to said annular conductor at a plurality of places spaced equally from the places where said arms join said conductor.

KENNETH V. HART.

REFERENCES CITED

The following references are of record in the file of this patent:

UNITED STATES PATENTS

| Number | Name | Date |
|---|---|---|
| 1,810,225 | Pugh | June 16, 1931 |
| 1,861,005 | Gibb | May 31, 1932 |
| 1,954,426 | Platz | Apr. 10, 1934 |
| 1,976,552 | Friesen | Oct. 9, 1934 |
| 2,313,941 | Humphrey et al. | Mar. 16, 1943 |
| 2,363,753 | Smith et al. | Nov. 28, 1944 |
| 2,330,658 | Albright | Sept. 28, 1943 |
| 2,365,148 | Clark | Dec. 12, 1944 |